March 1, 1938.  W. J. F. FORWARD  2,109,960
MACHINE TOOL
Filed May 28, 1937  4 Sheets-Sheet 1

INVENTOR.
Worthy J. F. Forward
BY
Harold C. Stonebraker,
his ATTORNEY.

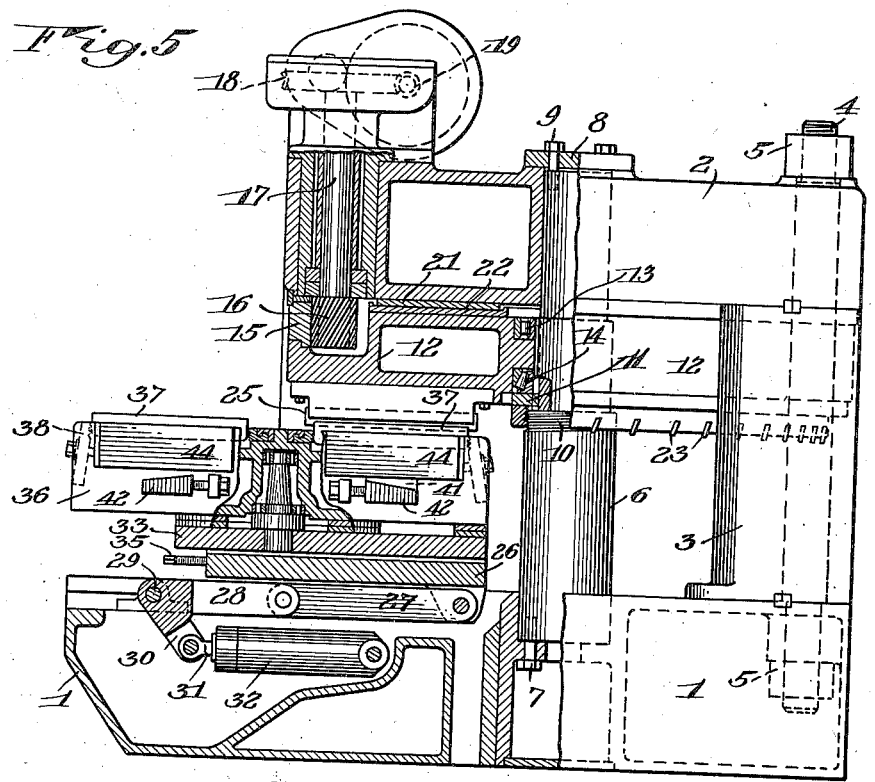
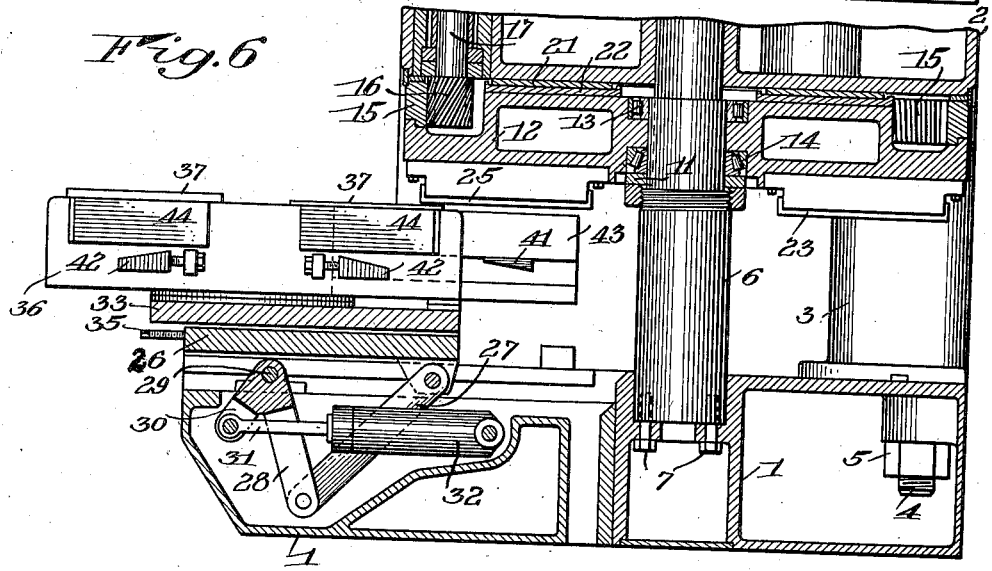

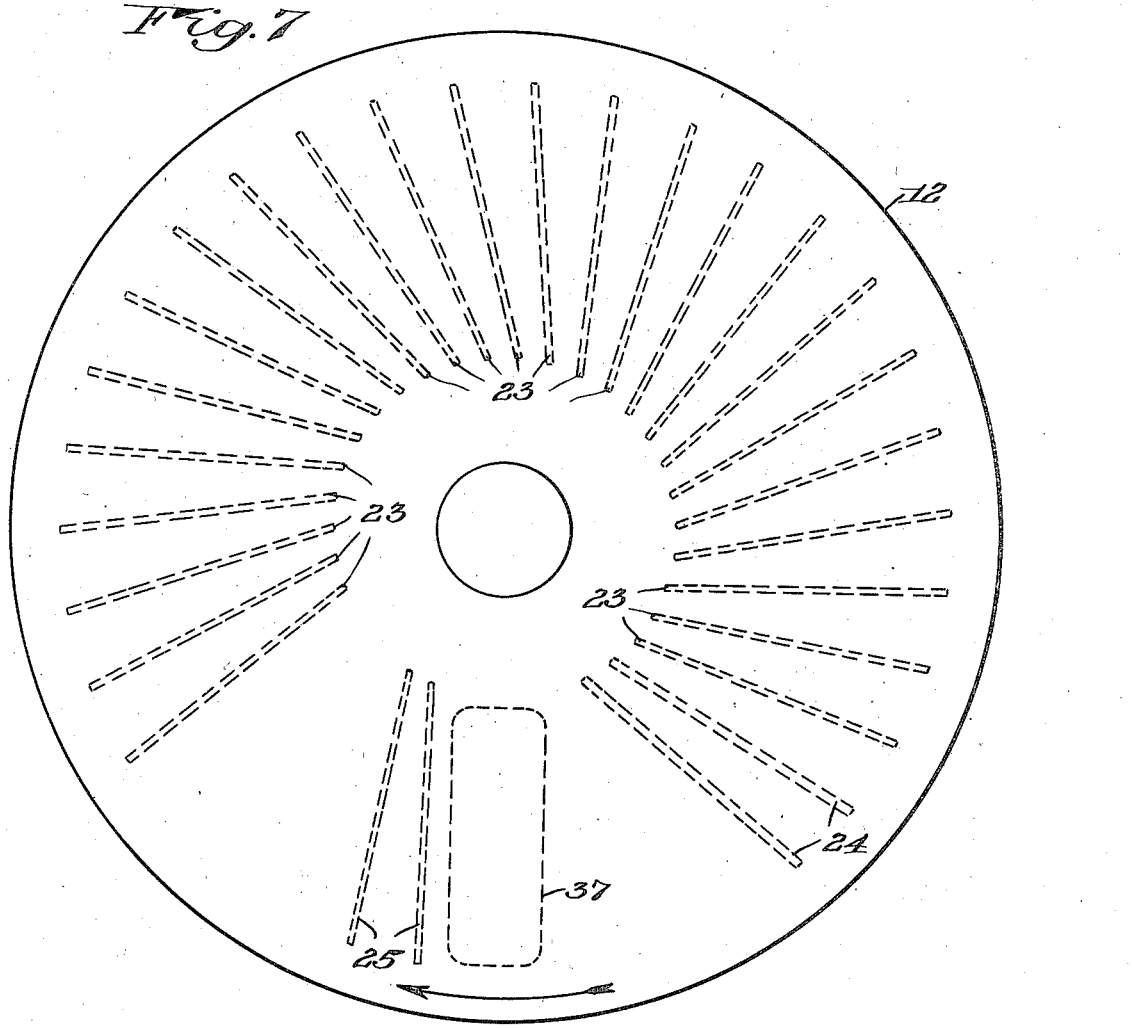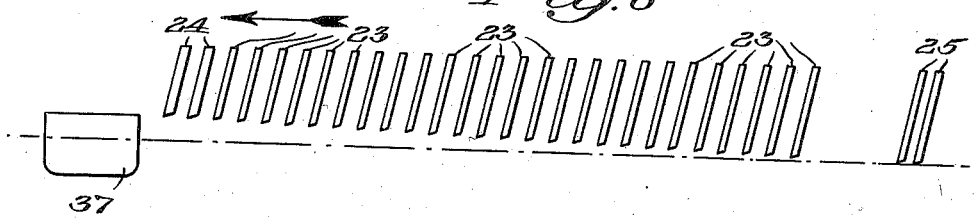

Patented Mar. 1, 1938

2,109,960

UNITED STATES PATENT OFFICE 2,109,960

MACHINE TOOL

Worthy J. F. Forward, Rochester, N. Y., assignor to Consolidated Machine Tool Corporation, Rochester, N. Y., a corporation of Delaware Application May 28, 1937, Serial No. 145,311

23 Claims. (Cl. 90—18)

This invention relates to a machine tool, and has for its object to afford a structure embodying a rotary tool holder provided with a series of radially arranged tools on one face cooperating with a work piece to remove a given thickness of metal during one rotation of the tool holder by successive deeper cutting action of the tools.

A more particular object of the invention is to afford a broaching machine of the general character referred to with a supporting frame of such design and arrangement as to maintain the tool carrier solidly in proper relation to the work, so as to resist successfully the strains to which the tools are subjected.

A further purpose of the invention is to afford a practical arrangement of tool carrier and drive mechanism therefor, such that the operation of the tool carrier can be commenced and stopped readily between successive rotations of the tool carrier.

Still another object of the invention is to afford a practical and efficient arrangement of work holder, to permit the work to be readily brought into operative position and to be rigidly held during the cutting operations against both vertical and horizontal movements, thus to insure proper functioning of the tools upon the work piece.

To these and other ends, the invention consists in the construction and arrangement of parts that will appear clearly from the following description when read in conjunction with the accompanying drawings, the novel features being pointed out in the claims following the specification.

In the drawings:

Fig. 5 is a vertical sectional view on the line 5—5 of Fig. 1, showing the work in operating position;

Fig. 6 is a similar view of the work holder and controlling mechanism, showing the work holder withdrawn from operative position;

Fig. 7 is a plan view of the tool carrier, and

Fig. 8 is a diagrammatic view illustrating the cutting relation of the tools to the work piece.

Figure 3:
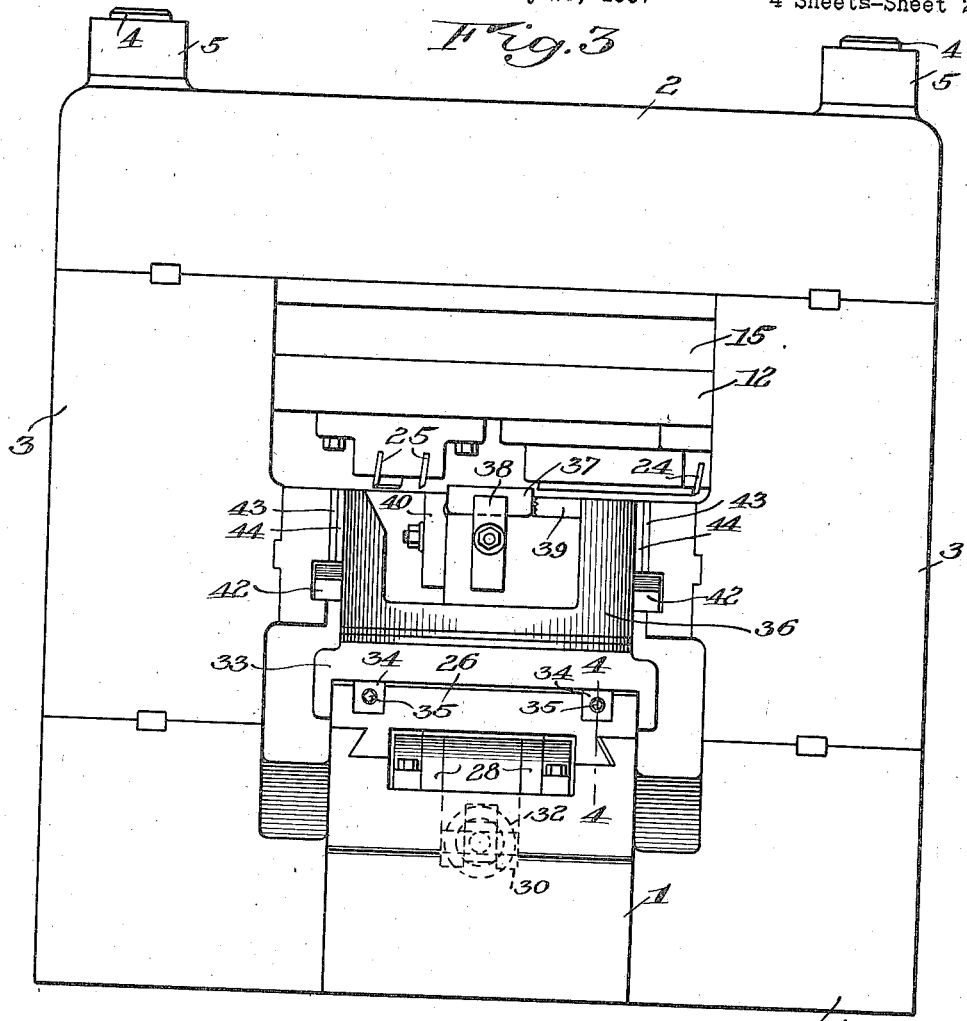
Fig. 3 is an end elevation.
Figure 4:
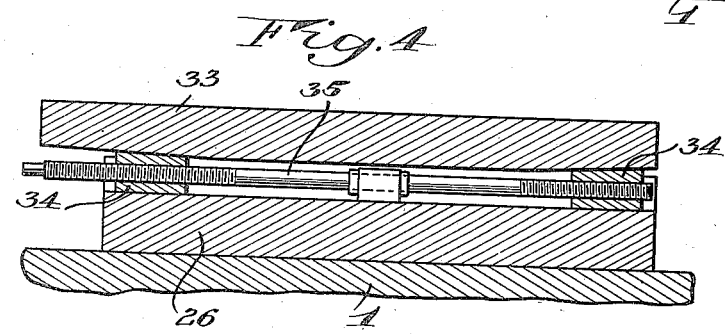
Fig. 4 is a vertical sectional view on the line 4—4 of Fig. 3.

Referring more particularly to the drawings in which like reference numerals refer to the same parts throughout the several views, the frame includes a base 1, see Figs. 3 and 5, a top portion 2, and corner sections 3 interposed between the base and top portion and secured together by the vertical tie rods 4 and nuts 5.

Mounted in a seat in the base 1 and extending through the top portion 2 is a central supporting post 6, see Fig. 5, which is secured to the base by the bolts 7 and held in relation to the top portion by the plate 8 and bolts 9. The supporting post 6 has a threaded portion 10 upon which is adjustably arranged a bearing plate 11, which supports the tool carrier 12, through the roller bearing assembly 13 and 14, on which the carrier rotates around the supporting post 6.

Figure 1:
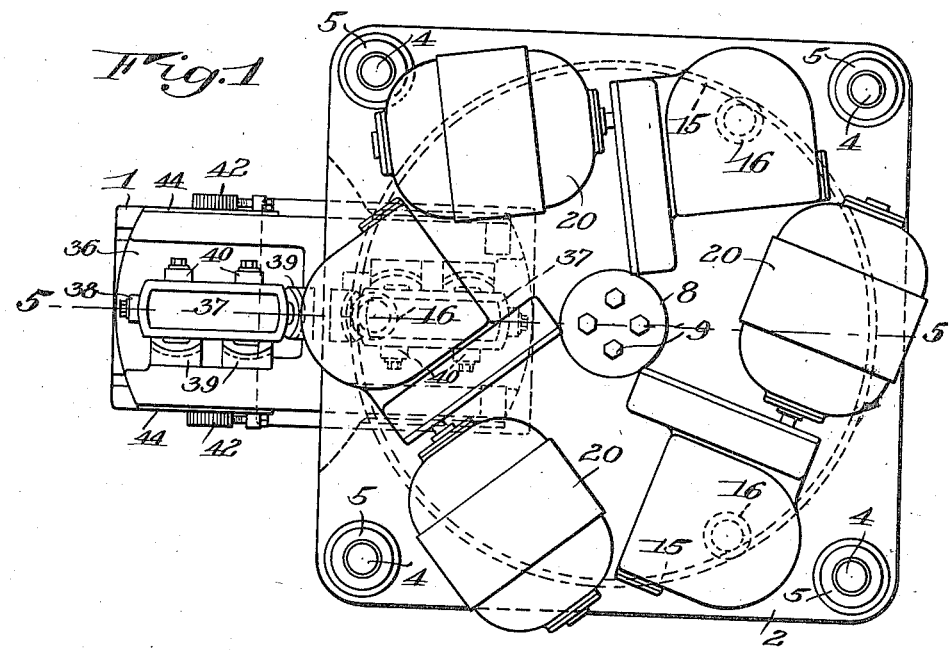
Fig. 1 is a plan view of a machine constructed in accordance with one practical embodiment of the invention.

The tool carrier 12 is of circular form, and has fixed thereto an internal helical ring gear 15, engaged at equidistant points by helical pinions 16, each of which is carried on a shaft 17 mounted vertically in the top portion 2. Each shaft 17 carries at its upper end a worm 18 engaged and driven by a worm gear 19 which is actuated from an electric motor 20, see Fig. 1. In the arrangement shown, there are three such pinions 16 driven by three independent electric motors 20, supported upon the top portion 2, and adapted to be controlled in any suitable way, so that the three motors can be started and stopped simultaneously to drive the tool carrier. This drive arrangement enables quick starting and stopping of the tool carrier, while affording sufficient power for the cutting operation.

The vertical thrust of the tool carrier is received by suitable thrust plates 21 and 22 located between the top of the tool carrier and the bottom of the top portion 2, as shown in Fig. 5. 23 designate the tools which are shown as straight cutters that may be secured in any convenient manner to the bottom surface of the tool carrier and extend, as shown in Fig. 7, between the center of the carrier and the outer edge thereof.

The tools 23 are preferably arranged tangentially to the center of the tool carrier to effect a shearing cut, and their cutting edges are disposed successively in lower planes, as illustrated in Fig. 8, so that during one rotation of the tool carrier, a cutting operation is completed by the removal of different portions of the work by the successive tools engaging the work piece in lower planes. Preferably there are two roughing or breaker tools as indicated at 24 in Fig. 2, and two finishing tools as indicated at 25, although this disposition of the tools may be varied to suit the particular requirements of the work.

The work piece is mounted on a work holder which includes a rotary table to permit loading while cutting, and is reciprocable to move the work to and from cutting position, with facilities for holding the work rigidly in cutting position against vertical and horizontal movements, and this is preferably accomplished by the following construction.

The work holder includes a support 26 slidable in suitable ways in the base of the machine and having pivotally connected thereto a link 27, see Fig. 6, of a toggle mechanism, the other link 28 of which is pivoted to the base at 29 and carries an arm 30 to which is pivoted a rod 31 that is connected to and controlled by a fluid pressure cylinder 32 in any suitable manner. By controlling the supply of fluid pressure to the cylinder 32, the toggle mechanism can be operated to the position shown in Fig. 6 to withdraw the work holder, or to the position shown in Fig. 5 where the toggle mechanism holds the work holder firmly in operating position.

Mounted on the support 26 is a suitable bed 33 which is adjustable vertically on the support by means of the threaded cam members 34, operable by adjusting screws 35, which are carried by the support 26. In this manner, the bed 33 and with it the work table to be described presently are adjustable vertically to bring the work piece into proper horizontal relationship with the tools.

Mounted upon the bed 33 is a rotary work table 36, adapted to be turned by the operator, so as to permit loading a work piece at the outer portion of the table 36, while the tools are operating upon a work piece at the inner portion thereof. The work piece is designated generally at 37, and is adapted to be held in position on the work table by suitable clamping members 38, 39 and 40, see Fig. 3.

It is essential, when the work holder is moved to operative position, that the work be held rigidly against horizontal or vertical play during the cutting operation. This is accomplished by cooperating clamping means on the frame and work table, including the fixed wedge members 41 on the frame, while the rotary work table is provided with cooperating wedge members 42, preferably adjustable endwise as shown, and arranged on opposite sides of the work table as shown. When the work holder is moved inwardly from the position shown in Fig. 6 to that shown in Fig. 5, the wedge members 42 engage under the fixed wedge members 41 and thereby hold the work table and work piece rigidly against vertical movement.

Figure 2:
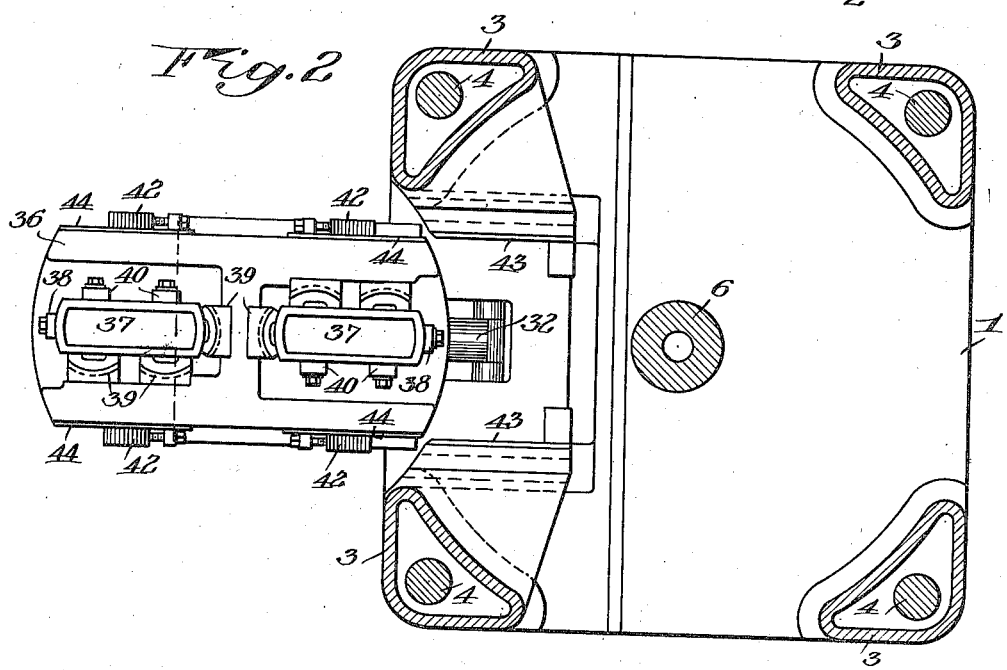
Fig. 2 is a horizontal sectional view taken somewhat above the work holder.

At the same time, it is equally important to hold the work piece against lateral play, as the tools engage the work, and to accomplish this, the frame is provided with fixed side thrust plates 43, while 44 designates cooperating thrust plates on the work table which engage snugly against the plates 43 as the work holder is moved inwardly, see Figs. 2 and 3. The thrust plates 43 and 44 are fitted closely and serve to take any lateral thrust of the table in the direction of tool travel, due to the resistance of the work piece against the action of the tools, and hold the work piece firmly against any such lateral play.

While the invention has been described with reference to the particular construction shown, it is not confined to this precise embodiment, and the application is intended to cover any modifications or changes coming within the purposes of the invention or the scope of the following claims.

I claim:

1. In a machine tool, the combination with a base, of a top portion, corner sections interposed between the base and top portion, means for securing the base, corner sections and top portion together, a centrally arranged supporting post positioned on the base and extending through the top portion, means for securing the supporting post to the base and top portion, a rotary tool carrier mounted on said supporting post, means for driving the tool carrier, and a reciprocatory work holder arranged beneath the tool carrier.

2. In a machine tool, the combination with a base, of a top portion, corner sections interposed between the base and top portion, means for securing the base, corner sections and top portion together, a centrally arranged supporting post positioned on the base and extending through the top portion, means for securing the supporting post to the base and top portion, a rotary tool carrier mounted on said supporting post, means for driving the tool carrier comprising a gear fixed thereto, a series of pinions journalled in the top portion and engaging said gear at equidistant points, and a series of electric motors each of which is operatively associated with one of said pinions.

3. In a machine tool, the combination with a base and a top portion, of a rotary tool carrier arranged between the base and top portion and supported thereby, a ring gear fixedly connected to the tool carrier, a series of pinions journalled in said top portion and engaging the ring gear at equidistant points, and a series of electric motors mounted upon said top portion and each operatively associated with one of said pinions.

4. In a machine tool, the combination with a base and a top portion, of a centrally arranged supporting post positioned on the base and extending through the top portion, means for securing the supporting post to the base and top portion, a rotary tool carrier mounted on the supporting post, and means for driving the tool carrier comprising a gear fixed thereto, a series of pinions journalled in the top portion and engaging said gear at equidistant points, and a series of electric motors mounted on the top portion each of which is operatively associated with one of said pinions.

5. In a machine tool, the combination with a base and a top portion, of a centrally arranged supporting post positioned on the base and extending through the top portion, means for securing the supporting post to the base and top portion, a rotary tool carrier mounted on the supporting post, cooperating thrust plates interposed between the bottom of the top portion and the top of said tool carrier, and means for driving the tool carrier comprising a gear fixed to the tool carrier, a series of pinions engaging said gear at equidistant points, and a series of electric motors each of which is operatively associated with one of said pinions.

6. In a machine tool, the combination with a base and a top portion, of a centrally arranged supporting post positioned on the base and extending through the top portion, means for securing the supporting post to the base and top portion, a rotary tool carrier mounted on the supporting post, and a series of tools mounted on the bottom of the tool carrier, said tools having their cutting edges disposed in successively lower planes and operable to complete a cutting operation during one rotation of the tool carrier.

7. In a machine tool, the combination with a rotary tool carrier having a series of tools arranged thereon between the center and outer edge of the carrier with their cutting edges disposed in successively lower planes so as to complete a cutting operation during one rotation of the carrier, of means for driving the tool carrier comprising a ring gear fixed thereto, a series of pinions engaging said ring gear at equidistant points, and a series of electric motors each of which is operatively associated with one of said pinions.

8. In a machine tool, the combination with a rotary tool carrier having a series of tools arranged thereon extending tangentially of the center of the carrier and with their cutting edges arranged in different planes so as to complete a cutting operation during one rotation of the carrier, of a shiftable work holder operable to position a work piece in the path of said tools, said work holder comprising a rotary table, a reciprocable support for the table, and fluid pressure controlled toggle mechanism connected to the support for operating the same.

9. In a machine tool, the combination with a rotary tool carrier having a series of tools arranged thereon extending tangentially of the center of the carrier and with their cutting edges arranged in different planes so as to complete a cutting operation during one rotation of the carrier, of a shiftable work holder operable to position a work piece in the path of said tools, said work holder comprising a rotary table, a reciprocable support for the table, means for adjusting the table vertically on said support, and fluid pressure controlled toggle mechanism connected to the support for operating the same.

10. In a machine tool, the combination with a stationary frame, of a rotary tool carrier mounted thereon and having a series of tools extending tangentially of the center of the carrier and with their cutting edges arranged in different planes so as to complete a cutting operation during one rotation of the carrier, a reciprocatory work holder operable to position a work piece in the path of said tools, and cooperating wedge members on the frame and on the work holder engageable with each other when the work holder is moved inwardly to clamp the latter against movement in a vertical direction.

11. In a machine tool, the combination with a stationary frame, of a rotary tool carrier mounted thereon and having a series of tools extending tangentially to the center of the carrier and with their cutting edges arranged in different planes so as to complete a cutting operation during one rotation of the carrier, a reciprocatory work holder operable to position a work piece in the path of said tools, said work holder including a support and a table rotatable thereon, and cooperating wedge members on the frame and on said rotatable table and cooperating when the work holder is moved inwardly to clamp the latter against movement in a vertical direction.

12. In a machine tool, the combination with a stationary frame, of a rotary tool carrier mounted thereon and having a series of tools extending tangentially of the center of the carrier and with their cutting edges arranged in different planes so as to complete a cutting operation during one rotation of the carrier, a reciprocatory work holder operable to position a work piece in the path of said tools, said work holder including a support and a table rotatable thereon, cooperating wedge members on the frame and on said table and cooperating when the work holder is moved inwardly to clamp the latter against movement in a vertical direction, and vertically disposed thrust plates on the frame and table and engageable with each other to maintain the table against lateral movement when the work holder is moved inwardly.

13. In a machine tool, the combination with a stationary frame, of a rotary tool carrier mounted thereon and having a series of tools extending tangentially of the center of the carrier and with their cutting edges arranged in different planes so as to complete a cutting operation during one rotation of the carrier, a reciprocatory work holder operable to position a work piece in the path of said tools, and cooperating clamping means on the work holder and frame engageable when the work holder is moved inwardly to maintain the latter against vertical and horizontal movement.

14. In a machine tool, the combination with a stationary frame, of a rotary tool carrier mounted thereon and having a series of tools extending tangentially of the center of the carrier and with their cutting edges arranged in different planes so as to complete a cutting operation during one rotation of the carrier, a reciprocatory work holder operable to position a work piece in the path of said tools, said work holder including a support and a table rotatable thereon, and cooperating clamping means on the table and frame engageable when the work holder is moved inwardly to maintain the latter against vertical and horizontal movement.

15. In a machine tool, the combination with a rotary tool carrier having a series of tools arranged thereon with their cutting edges in different planes so as to complete a cutting operation during one rotation of the carrier, of a shiftable work holder operable to position a work piece in the path of said tools, said work holder comprising a rotary table, a reciprocable support for the table, and fluid pressure controlled mechanism connected to the support for operating the same.

16. In a machine tool, the combination with a stationary frame, of a rotary tool carrier mounted thereon and having a series of tools with their cutting edges arranged in different planes so as to complete a cutting operation during one rotation of the carrier, a reciprocatory work holder operable to position a work piece in the path of said tools, and cooperating wedge members on the frame and on the work holder engageable with each other when the work holder is moved inwardly to clamp the latter against movement in a vertical direction.

17. In a machine tool, the combination with a stationary frame, of a rotary tool carrier mounted thereon and having a series of tools with their cutting edges arranged in different planes so as to complete a cutting operation during one rotation of the carrier, a reciprocatory work holder operable to position a work piece in the path of said tools, said work holder including a support and a table rotatable thereon, and cooperating wedge members on the frame and on said rotatable table and cooperating when the work holder is moved inwardly to clamp the latter against movement in a vertical direction.

18. In a machine tool, the combination with a stationary frame, of a rotary tool carrier mounted thereon and having a series of tools with their cutting edges arranged in different planes so as to complete a cutting operation during one rotation of the carrier, a reciprocatory work holder operable to position a work piece in the path of said tools, and cooperating clamping means on the work holder and frame engageable when the work holder is moved inwardly to maintain the latter against horizontal movement.

19. In a machine tool, the combination with a rotary tool carrier having a series of tools arranged thereon with their cutting edges in different planes so as to complete a cutting operation during one operation of the carrier, of a ring gear fixed thereto, a series of pinions engaging said gear at equidistant points, a series of electric motors each of which is operatively associated with one of said pinions, a reciprocable work holder, and fluid pressure controlled mechanism for operating the work holder.

20. In a machine tool, the combination with a rotary tool carrier having a series of tools arranged thereon with their cutting edges in different planes so as to complete a cutting operation during one operation of the carrier, a stationary frame, of a reciprocatory work holder, cooperating clamping means on the frame and work holder, and fluid pressure operated means for controlling the work holder.

21. In a machine tool, the combination with a rotary tool carrier having a series of tools arranged thereon with their cutting edges in different planes so as to complete a cutting operation during one operation of the carrier, a stationary frame, of a reciprocatory work holder, and cooperating wedge members on the frame and work holder whereby the latter is clamped when moved inwardly.

22. In a machine tool, the combination with a rotary tool carrier having a series of tools arranged thereon with their edges in different planes so as to complete a cutting operation during one rotation of the carrier, of a shiftable work holder comprising a rotary table, and a reciprocable support for the table operable to position a work piece in the path of said tools.

23. In a machine tool, the combination with a rotary tool carrier having a series of tools arranged thereon with their cutting edges in different planes so as to complete a cutting operation during one operation of the carrier, a stationary frame, of a reciprocatory work holder, cooperating wedge members on the frame and work holder whereby the latter is clamped when moved inwardly, and fluid pressure operated means for controlling the work holder.

WORTHY J. F. FORWARD.